US 8,582,047 B2

(12) United States Patent
Tho et al.

(10) Patent No.: US 8,582,047 B2
(45) Date of Patent: Nov. 12, 2013

(54) DISPLAY DEVICE AND WINDOW MANUFACTURING METHOD FOR THE DISPLAY DEVICE

(75) Inventors: Gihoon Tho, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 12/953,186

(22) Filed: Nov. 23, 2010

(65) Prior Publication Data

US 2011/0260989 A1 Oct. 27, 2011

(30) Foreign Application Priority Data

Apr. 22, 2010 (KR) .................. 10-2010-0037128

(51) Int. Cl.
*G02F 1/1333* (2006.01)
*G02F 1/335* (2006.01)

(52) U.S. Cl.
USPC ............................................. 349/58; 349/12

(58) Field of Classification Search
USPC ........................................ 349/12, 58
See application file for complete search history.

(56) References Cited

U.S. PATENT DOCUMENTS 8,081,269 B2 * 12/2011 Yada et al. .................. 349/60

FOREIGN PATENT DOCUMENTS

WO  WO 2008/120879 A1  10/2008
WO  WO 2009/126480 A2  10/2009

* cited by examiner

*Primary Examiner* — James Dudek
(74) *Attorney, Agent, or Firm* — Birch, Stewart, Kolasch & Birch, LLP

(57) ABSTRACT

According to an embodiment of the present invention, a display device includes a body, a display part disposed inside of the body, and configured to display information, a first window disposed on a front surface of the display part and maintaining a distance from the body and the display part, and a second window provided between the body and the first window.

17 Claims, 8 Drawing Sheets

DISPLAY DEVICE AND WINDOW MANUFACTURING METHOD FOR THE DISPLAY DEVICE

CROSS-REFERENCE TO RELATED APPLICATIONS

Pursuant to 35 U.S.C. §119(a), this application claims the benefit of earlier filing date and right of priority to Korean Application No. 10-2010-0037128, filed on Apr. 22, 2010, the contents of which are hereby incorporated by reference herein in their entirety.

BACKGROUND OF THE INVENTION

1. Field of the Invention

The present invention relates to a display device and a window manufacturing method applied to the display device.

2. Description of the Related Art

Now days, a display device has more functions than just displaying a piece of information on a display panel. A piece of information can be input and output, data can be stored, and a voice and video phone calls can be made using a display device.

Currently, 3-Dimensional (3D) motion picture development is on a rise and a demand for a display device that can display 3D images has greatly increased. Typically, a display device that can display 3D images includes a body, a display part disposed inside of the body, and a window fixed to the body for protecting the display part.

Such a display device needs a window to be manufactured in various 3D curvature forms suitable for a 3D shape in order to realize 3D images. However, it is difficult to manufacture a glass window in a curvature form and the manufacturing cost can be costly.

SUMMARY OF THE DISCLOSURE

Accordingly, an object of the present invention is to address the above-noted and other problems.

Another object of the present invention is to manufacture a curvature form window by attaching two windows to each other for providing a display device that can be easily manufactured and reduce its manufacturing cost.

Another object of the present invention is to provide a display device that can transmit the light source of a display part to the side surface of a window.

Technical challenges that can be achieved by the present invention are not limited to the above-mentioned technical problems, but not yet mentioned another technical problem can be clearly appreciated by an ordinary person in the art through the following recitation.

A display device related to one example of the present invention for realizing the above tasks includes a body, a display part disposed inside of the body, a first window disposed on the front surface of the display part and a second window glass attached to at least one edge of a multiple of edges of the first window.

A window manufacturing method for a display device related to one example of the present invention comprises; manufacturing a first window in a flat panel form; manufacturing a second window in an angled bar form; and adhering the second window to edges of the first window.

According to an embodiment of the present invention, a display device includes a body, a display part disposed inside of the body, and configured to display information, a first window disposed on a front surface of the display part and maintaining a distance from the body and the display part, and a second window provided between the body and the first window.

According to another embodiment of the present invention, a window manufacturing method for a display device includes manufacturing a first window and a second window separately, wherein the first window is manufactured in a flat panel form and the second window is manufactured in a angled bar form, polishing the manufactured first and the second windows separately, and attaching the second window to edges of the first window.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF PREFERRED EMBODIMENTS

Figure 1:
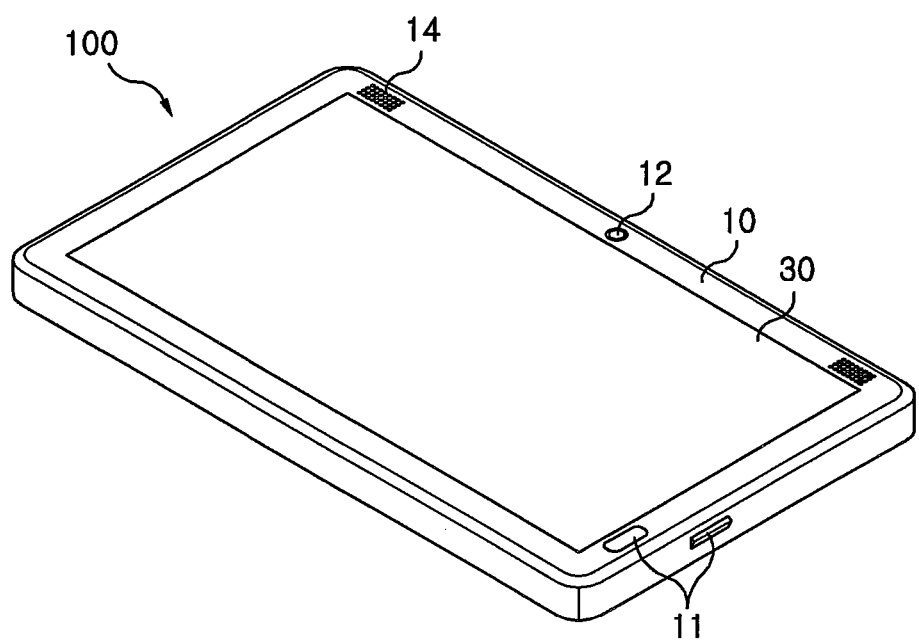
FIG. 1 is a perspective view of a display device according to one embodiment of the present invention.

Reference will now be made in detail to the preferred embodiments of the present invention, examples of which are illustrated in the accompanying drawings.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

In the following, with reference to attached views of embodiments of the present invention will be described in detail. For the convenient and clear understanding of the present invention, sizes and shapes of components shown in the drawings may be exaggerated. Also, specially defined terms under the consideration of the construction and action of the present invention can be varied according to the intention or custom of a user and an operator. The definition of such terms can be made based on the description throughout the specification. Further, different embodiments may include identical components and the identical components are assigned identical reference numbers even in different embodiments. Further, the description corresponding the identical components may be used to explain the identical components in different embodiments. A singular expression used includes the plural expression unless it is clearly indicated to mean otherwise in the context.

Figure 2:
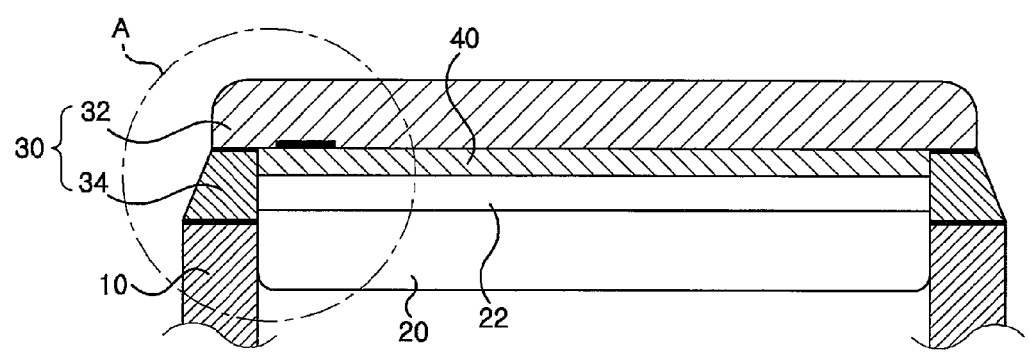
FIG. 2 is a section view of a display device according to one embodiment of the present invention.
Figure 3:
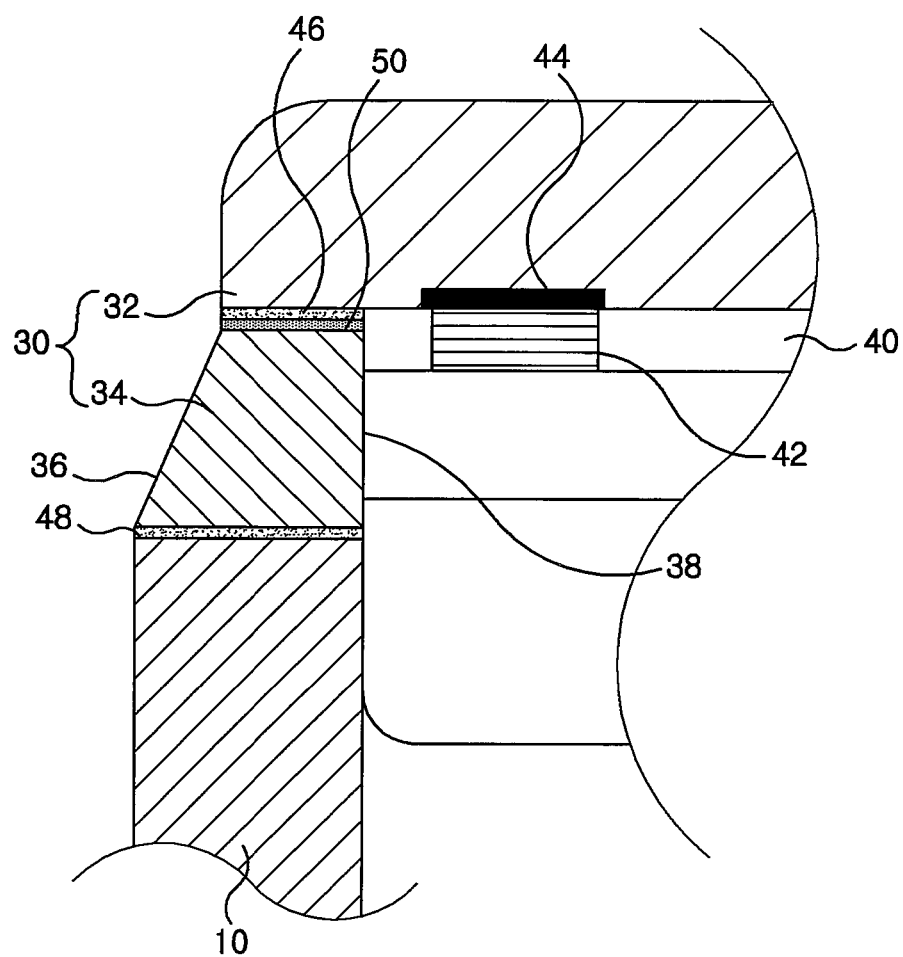
FIG. 3 is an enlarged view of 'A' part in FIG. 2.

FIG. 1 is a perspective view of a display device according to one embodiment of the present invention, and FIG. 2 is a section view of a display device according to one embodiment of the present invention, and FIG. 3 is an enlarged view of 'A' part in FIG. 2.

Referring to FIG. 2, a display device 100 includes a body 10, a display part 20 attached to the front surface of the body 10 to display information, and a window 30 attached to the body 10 to protect the display part 20. The display device 100 can be applied to any electronic devices with a display part 20 capable of displaying information. The display device can include, for example, a monitor, a TV, and a portable electronic device (a laptop computer, a cell phone, a smart phone, a digital broadcasting terminal, PDAs (Personal Digital Assistants), a PMP (Portable Multimedia Player), a navigation, etc.).

The body 10 can be a case constituting the outer part of the display device 100. The body 10 can have one continuous body, or have a multiple bodies joined together so that the body 10 can be opened or closed. Referring to FIG. 1, the body 10 of the display device 100 further includes an input part 11 for inputting information and a battery for supplying power. In addition, the body 10 can include a camera 12, a sound output module (a receiver, a speaker, a buzzer, etc.) 14, a communication module (not shown), a beam project module (not shown) and any other parts. The display part 20 can include at least one of a liquid crystal display (LCD), a thin film transistor-liquid crystal display (TFT LCD), an organic light-emitting diode (OLED), a flexible display, and a 3D display. The display part 20 displays various visual information including character, number, notation, graphic, or icon, etc.

Referring to FIG. 2, the window 30 includes a first window 32 disposed in a certain gap at the front of the display part 20, and a second window 34 attached to at least one edge of a multiple of edges in the first window 32. Here, the window 30 can be formed of translucent material such as synthetic resins and tempered glass. The first window 32 can be a flat plate shape formed of a transparent material in order to show information displayed on the display part 20. Further, the first window 32 can be a shape including, for example, convexly forming towards the outside having a convex shape, and falling inwards having a concave shape. Further, the convex shape and the concave shape of the first window can be formed on the outer surface of the first window and a flat shape in the inner surface of the first window. A certain gap 22 is provided between the first window 32 and the display part 20. And, on the inner surface of the first window 32, a touchpad 40 for inputting information in a touch mode can be provided.

Referring to FIG. 3, the touchpad 40 is of a transparent film form. Here, a silver pattern 42 for signal transmission can be provided at the edge regions of the touchpad 40. In order to prevent the silver pattern 42 from being exposed to the outside through the first window 32, a print layer 44 is provided on top of the silver pattern 42 to cover the silver pattern 42. The print layer 44 is formed on the inner surface of the first window 32. In FIG. 3, because the first window 32 has a flat shape, at least in its inner surface, the touch pad 40 can easily be attached to the first window 32. Accordingly, a faulty attachment ratio of the touch pad 40 and the first window 32 can be minimized. Further, it is easy to form the print layer 44 on the inner surface of the first window 32 since the inner surface of the first window 32 is of a flat surface form.

Further, the second window 34 can be disposed at both edges of the longitudinal direction of the first window 32, for example, when the first window 32 of a rectangular shape. Further, the second window 34 is provided between the first window 32 and the body 10. In addition, the second window 34 can be attached to at least one edge of four edges of the first window 32. The second window 34 is attached to at least one edge of the first window 32 through a first adhesion layer 46 on the upper surface, and attached to the body 10 through a second adhesion layer 48 on the lower surface. And, the first window 34 and the second window 32 may be transparent materials with the same refraction index. Further, the first adhesion layer 46 may include various adhesion layers such as an adhesive and a double-sided adhesive tape, and it is desirable to use materials which have high transparency and with the most similar refraction index to the window 30. The second adhesion layer 48 is used to fix the second window 34 to the body 10, and may be a double-sided adhesive tape, an adhesive, etc.

A mirror deposition layer 50 is formed to on at least one surface of the second window 34 to prevent the inside of the body 10 or the second adhesive layer 48 from being exposed to the outside through the second window 34. The mirror deposition layer 50 may be formed on the upper surface or the lower surface of the second window 34.

Referring to FIG. 3, the second window 34 is formed in an angled prism shape to refract the light source of the display part 20 in a lateral direction of the body 10. That is, the second window 34 has a shallow width in the upper surface and a wide width in the lower surface, and the outer surface is formed of an inclined surface 36 and the inner surface is formed of a vertical surface 38. The second window 34 refracts the light source of the display part 20 in order to transmit light in a lateral direction of the body 10. And, this prism effect of the second window 34 prevents the lateral surface of the touch panel 40 attached on the inner surface of the first window 32 to be exposed from the outside. As such, a window manufacturing method of a constructed display device according to one embodiment of the present invention will be described below.

Figure 4:
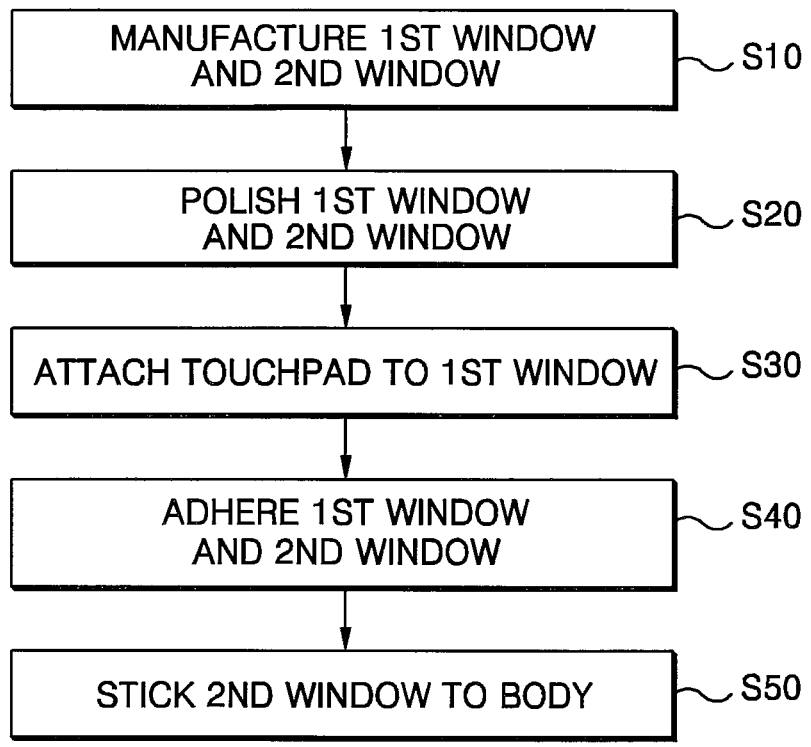
FIG. 4 is a flowchart indicating a window manufacturing process of a display device according to one embodiment of the present invention.

FIG. 4 is a flowchart indicating the window manufacturing process of a display device according to one embodiment of the present invention.

First, a first window 32 and a second window 34 are manufactured (S10). Here, the first window 32 is manufactured in a flat panel shape. As the manufacturing process to produce a flat panel shape first window is simple and easy, the manufacturing cost can be reduced and the productivity can be improved. Here, the outer surface of the first window 32 may be formed in various forms such as, besides a flat surface shape, a convex shape, a concave shape, etc., and the lower surface is desired to be formed in a flat plate shape.

Here, the second window 34 is manufactured separately from the first window 32. Although the second window 34 is of an angled bar shape, the manufacturing process of the second window 34 is simple as it is simple to cute a flat panel glass in a bar shape when manufacturing. Further, in order to form a prism shape, the second window 34 is cut in a rectangular bar shape and then the at least one surface is formed of an inclined surface 36 through a NC processing. Thereafter, the surfaces of the first window 32 and the second window 34 are polished to produce the first window 32 and the second window 34 with precise dimensions (S20).

Then, before attaching the second window 34 and the first window 32, a print layer 46 is formed and a touchpad 40 is attached on the inner surface of the first window 32 (S30). As the inner surface of the first window 32 in a flat panel shape, it is easy to form the print layer 46 and to attach a touchpad 40 on the inner surface of the first window 32. Next, the window 30 is manufactured by attaching the second window 34 to edges of the first window 32 (S40). Here, the mirror deposition layer 50 is provided on the upper surface or the lower surface of the second window 34. Then, the window manufacturing step is completed by attaching the second window 34 to edges of the first window 32 using the first adhesive layer 46.

Finally, an assembly of the display device 100 is completed by attaching the manufactured window 30 to the body 10 (S50). That is, the lower surface of the second window 34 and the body 10 are attached using the second adhesive layer 48. As such, the manufacturing cost can be reduced and the manufacturing process can be simplified by dividing the window 30 of a display device into the first window 32 and the second window 34 and then attaching the first window 32 and the second window 34.

Figure 5:
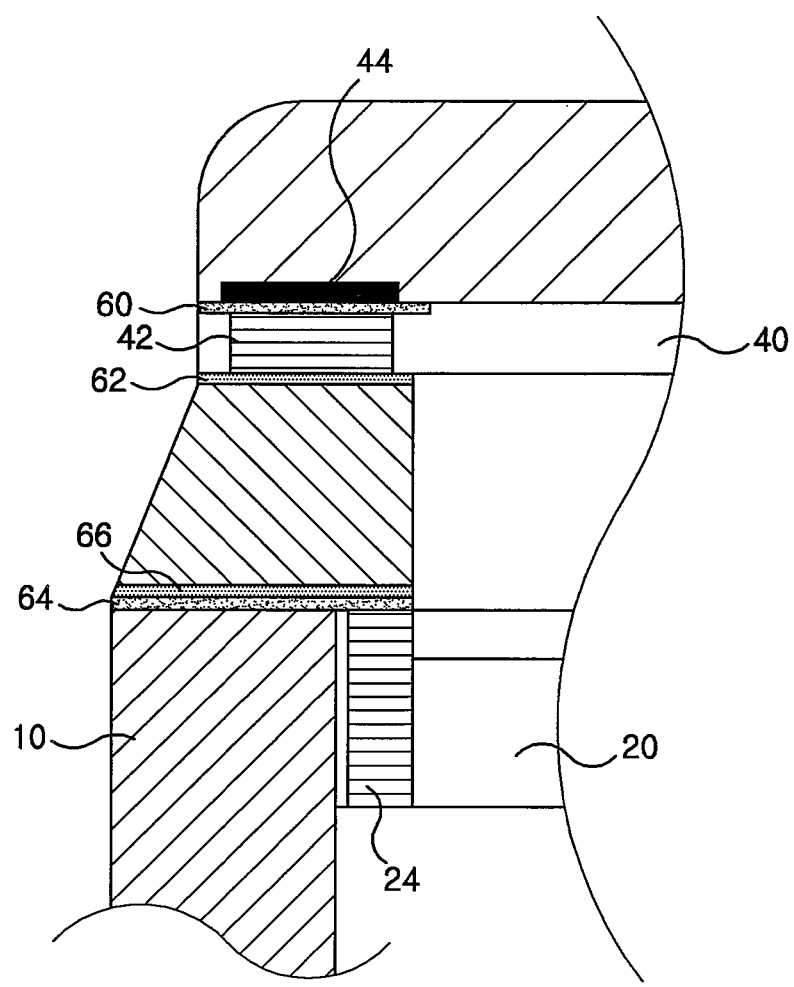
FIG. 5 is a partial sectional view of a display device according to a second embodiment of the present invention.

FIG. 5 is a sectional view of a display device according to the second embodiment of the present invention.

As shown in FIG. 5, in the manufacture of a display device according to the second embodiment, the touchpad 40 is attached to the inner surface of the first window 32, and the second window 34 is attached on the lower surface of the touchpad 40. On the edge regions of the touchpad 40, a silver pattern 42 for signal transmissions is disposed between the first window 32 and the second window 34 to expand a display region. Further, a black matrix 24 is provided at the edges of the display part 20 and is disposed on the lower surface of the second window 34.

The structures of the first window 32 and the second window 34 according to the second embodiment shall be omitted since they are the same as the structures of the first window 32 and the second window 34 described in one embodiment. On the edge regions of the first window 32, a print layer 44 is formed to cover and to prevent the silver pattern 42 of the touchpad 40 from being exposed to the outside. Here, the inner surface of the first window 32 and the upper surface of the touch pad 40 are attached by using a first adhesive layer 60. Further, the upper surface of the second window 34 and the lower surface of the touchpad 40 are attached to each other by using a second adhesive layer 62. A mirror deposition layer 66 is formed on the lower surface of the second window 34. The lower surface of the second window 34 also is attached to the body 10 and the black matrix 24 of the display part 20 by using a third adhesive layer 64.

As described above, a display device according to the second embodiment can dispose the silver pattern 42 of the touch pad 40 on the adhering surface between the first window 32 and the second window 34, and can also attach the black matrix 24 region of the display part 20 to the lower surface of the second window 34 in order to expand the display region in its maximum.

Figure 6:
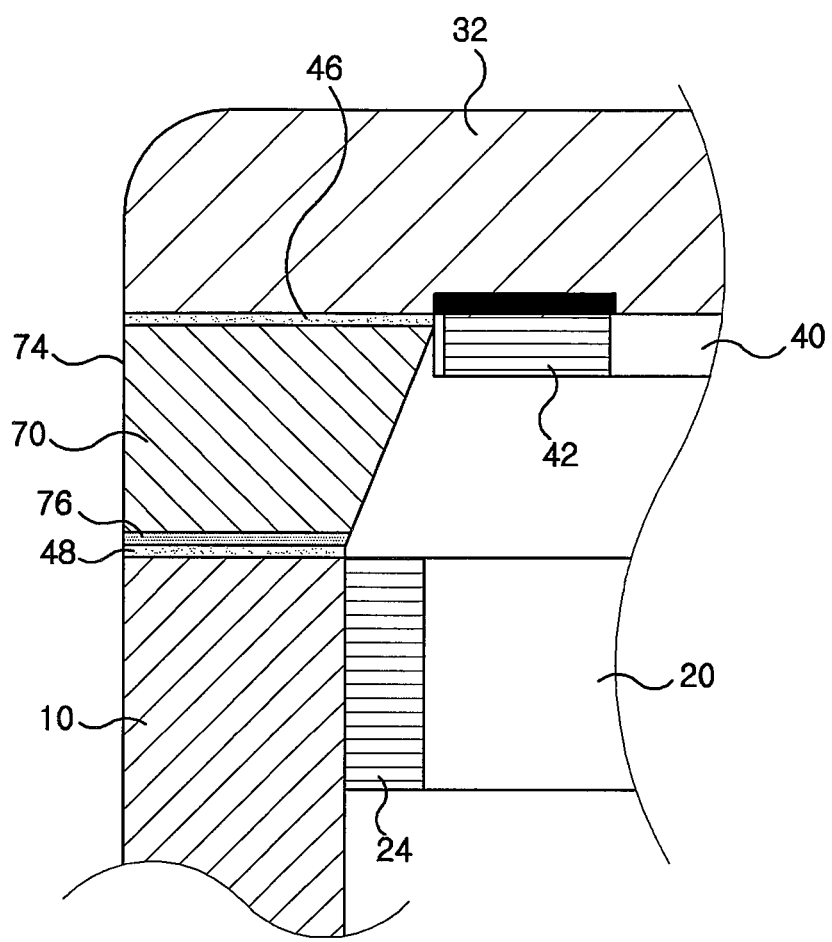
FIG. 6 is a partial sectional view of a display device according to a third embodiment of the present invention.

FIG. 6 is a partial sectional view of a display device according to the third embodiment of the present invention.

A display device according to the third embodiment is identical to or similar to the display device described in one embodiment, however the structure of the second window 70 is different. As shown in FIG. 6, the second window 70 according to the third embodiment has a wide width on its upper surface and a shallow width on its lower surface. The second window 70 has an inclination surface 72, a vertical surface 74, and a minor deposition layer 74. Here, the inclination surface 72 is provided in the inner surface of the second window 70 and decreases in width as proceeding towards the body 10. The vertical surface 74 is formed on the outer surface of the second window 70 and the mirror deposition layer 74 is formed on the lower surface of the second window 70. Further, the vertical surface 74 is located on the outer surface of the display device 100 to form the width of the display device 100. The vertical surface can be shallow.

Figure 7:
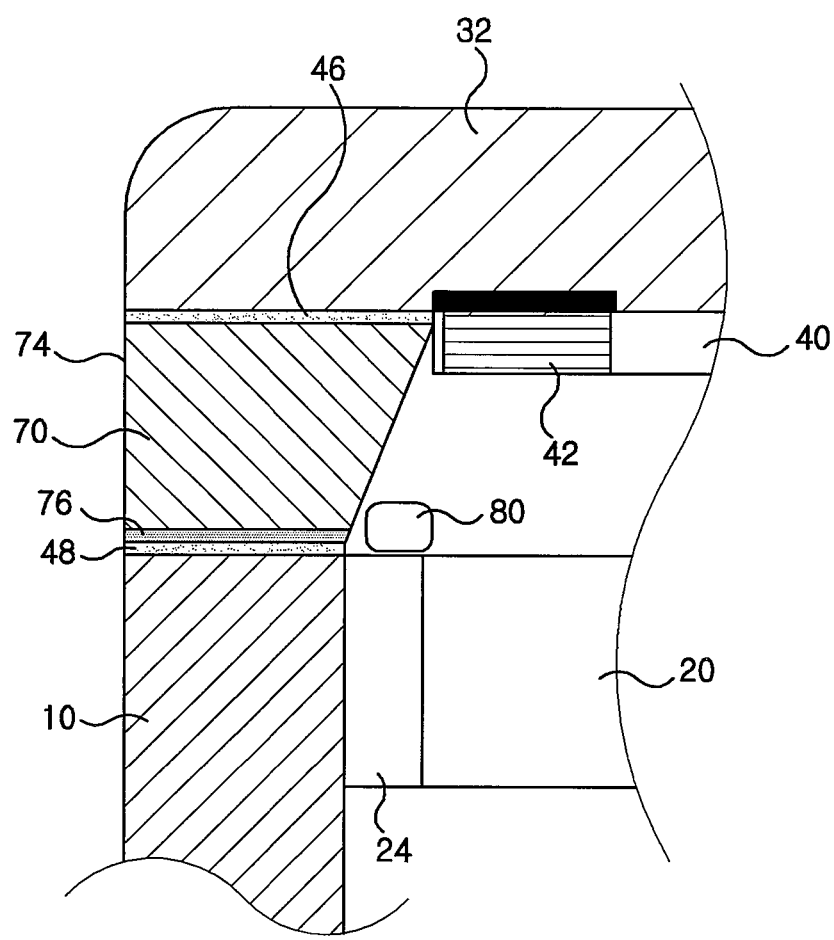
FIG. 7 is a partial sectional view of a display device according to a fourth embodiment of the present invention.

FIG. 7 is a partial section view of a display device 100 according to a fourth embodiment of the present invention. The display device 100 can be any one of a display device according to one embodiment. In addition, the display device 100 can have an illumination unit 80 which emits light through the second window 70. The display device 100 includes an illumination unit 80 emitting light in the internal surface of the second window 70, and the light emitted from the illumination unit 80 diverges through the second window 70. Further, the illumination unit 80 radiates at the outer surface of the display device 100. The illumination unit 80 can include various light-emitting devices, but it would be desired to use a LED. The display device can be applied to a mobile communication terminal.

Figure 8:
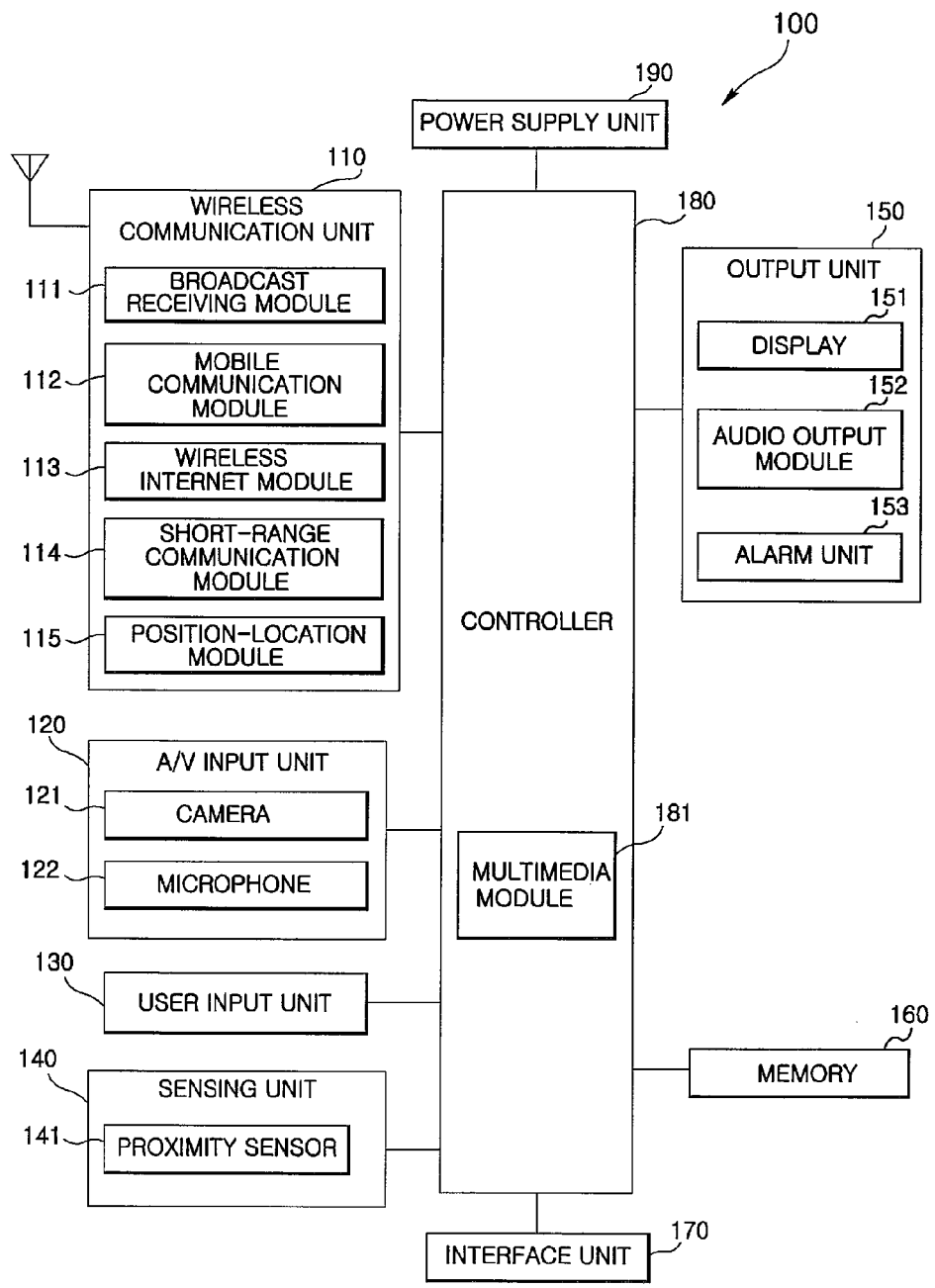
FIG. 8 is a block diagram of a mobile communication terminal according to an embodiment of the present invention.

FIG. 8 is a block diagram of a mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a control unit 180 and a power supply unit 190. The number of components included in the mobile terminal can be varied.

In addition, the wireless communication unit 110 includes at least one module that enables a radio communication between the mobile terminal 100 and a wireless communication system or between the mobile terminal 100 and a network where the mobile terminal 100 is located. For example, in FIG. 8, the wireless communication unit 110 includes a broadcast reception module 111, a mobile communication module 112, a wireless internet module 113, a short-range communication module 114, and a position information module 115.

The broadcast reception module 111 receives a broadcast signal and/or broadcast related information from an external broadcast management server through a broadcast channel. Further, the broadcast channel can include a satellite channel and a terrestrial channel. Also, the broadcast management server can be a server that generates and transmits a broadcast signal and/or broadcast related information or a server that receives a previously generated broadcast signal and/or broadcast related information and transmits the broadcasting signals and/or broadcasting related information to a terminal. The broadcast signal can include not only TV broadcast signals, radio broadcast signals, data broadcast signals, but also include signals in the form of a combination of a data broadcast signal with a TV broadcast signal or a radio broadcast signal.

In addition, the broadcast related information can be information on a broadcast channel, a broadcast program or a broadcast service provider. The broadcast related information can be provided even through a mobile communication network. In this instance, the broadcasting related information can be received by the mobile communication module 112. The broadcast related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system In addition, the broadcast reception module 111 receives broadcasting signals using various broadcasting systems. In particular, the broadcast reception module 111 can receive a digital broadcast signal using a digital broadcast system, such as the digital multimedia broadcasting-terrestrial (DMB-T) system, the digital multimedia broadcasting-satellite (DMB-S) system, the media forward link only (MediaFLO) system, DVB-H system, and the integrated services digital broadcast-terrestrial (ISDB-T) system. The broadcast reception module 111 can be constructed to be suited to broadcast systems providing broadcasting signals other than the above-described digital broadcasting systems. The broadcast signal and/or broadcast related information received through the broadcast reception module 111 can be stored in the memory 160.

Further, the mobile communication module 112 transmits/receives a radio signal to/from at least one of a base station, an external terminal, and a server on a mobile communication network. The radio signal can include various forms data according to a voice call signal, a video phone call signal or text/multimedia message transmit/reception. The wireless internet module 113 corresponds to a module for a wireless internet access, and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless internet technique. The short-range communication module 114 corresponds to a module for a short-range communication. Bluetooth, radio frequency identification (RFID), infrared data association (IrDA), ultra wideband (UWB), ZigBee can be used as a short range communication technique.

In addition, the position information module 115 confirms or obtains the position of the mobile terminal 100. A global position system (GPS) module is a representative example of the position information module 115. Further, the GPS module 115 can calculate information on distances between one point (object) and at least three satellites and information on the time when the distance information is measured and can apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 8, the A/V (Audio/Video) input unit 120 is used to input an audio signal or video signal input, and this unit 120 includes a camera 121, a microphone 122. The camera 121 processes image/video frames of still images or moving images obtained by an image sensor in a video telephony mode or a photograph mode. The processed image/video frames can be displayed on the display part 151. In addition, the processed image/video frames by the camera 121 can be stored in the memory 160 or transmitted to an external device through the wireless communication unit 110. The mobile terminal 100 can also include at least two cameras according to constitution of the terminal.

Further, the microphone 122 receives an external audio signal by a microphone in a phone call mode or a recording mode or a voice recognition mode. and processes the received audio signal into an electric voice data. The processed audio data can be converted through the mobile communication module 112 into a form transmittable to a mobile telecommunication base station and output in the call mode. The microphone 122 can employ various noise removal algorithms for removing noise generated when the external audio signal is received.

In addition, the user input unit 130 receives input data for controlling the operation of the terminal from a user. The user input unit 130 can include a key pad dome switch, a touch pad (static pressure, Electro static), a jog wheel, a jog switch, and so on. The sensing unit 140 senses the current state of the mobile terminal 100, such as the open/closed state of the mobile terminal 100, the position of the mobile terminal 100, whether a user touches the mobile terminal 100, the direction of the mobile terminal 100, acceleration/deceleration of the mobile terminal, and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

The output unit 150 generates visual, auditory, or touch sense, and so on. As shown in FIG. 1, the output unit 150 can include a display unit 151, a sound output module 152, an alarm unit 153, and a haptic module 154, etc. The display unit 151 displays information processed by the mobile terminal 100. For example, the display 151 displays a user interface (UI) or graphic user interface (GUI) related to a telephone call when the mobile terminal is in the call mode. When the mobile terminal 100 is in the video phone mode or the photograph mode, The display 151 also displays a captured or/and received image photographed/captured and/or received images or UI, GUI.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred as a transparent display. The transparent display also includes a transparent liquid crystal display and Transparent OLED (TOLED). The rear structure of the display unit 151 is also constructed as a light transmission structure. through, which is occupied by the display 151. According to this structure, a user can see an located behind the body of the mobile terminal 100 through an area of the body of the mobile terminal 100, which is occupied by the display unit 151 of the terminal 100.

Further, the mobile terminal 100 can include at least two display units 151. For example, in the mobile terminal 100 can include a plurality of displays that are arranged on a single face at a predetermined distance or integrated. Otherwise, the plurality of displays can be arranged on different sides. In addition, when the display unit 151 and a sensor for detecting a touch action form a layered structure, which is referred to as a touch sensor hereinafter, the display unit 151 can be used as an input device in addition to an output device. The touch sensor can be in the form of a touch film, a touch sheet, and a touch pad, for example.

Also, the touch sensor can be constructed such that the touch sensor converts a variation pressure applied to a specific portion of the display unit 151 or variation in capacitance generated at a specific portion of the display 151 into an electric input signal. The touch sensor can also be constructed such that the touch sensor can sense pressure of touch as well as the position of area of the touch. When a touch input is applied to the touch sensor, a signal corresponding to the touch input is transmitted to a touch controller. The touch controller then processes the signal and transmits data corresponding to the processed signal to the control unit 180. Accordingly, the control unit 180 can detect a touch portion of the display unit 151.

Referring to FIG. 8, the proximity sensor 141 can be located in the internal region of the mobile terminal 100, surrounded by the touch screen, or near the touch screen. The proximity sensor 141 senses an object approaching a predetermined sensing face or an object located near the proximity sensor 141 using electromagnetic field force or infrared without a mechanical contact. Further, the proximity sensor 141 has a longer lifetime than that of a contact sensor and has wide application. The proximity sensor 141 also includes a transparent type photoelectric sensor, a direct reflection-type photoelectric sensor, a mirror reflection-type photoelectric sensor, a high frequency oscillation-type proximity sensor, a capacitance-type proximity sensor, a magnetic-type proximity sensor, an infrared proximity sensor, etc. In addition, electro static type touch-screen can be constructed to detect the approach of a pointer through a variation in an electric field change according to the proximity of a pointer. In this case, the touch screen can be a proximity sensor.

For convenience of explanation, an action of approaching the pointer to the touch-screen while the pointer is not in contact with the touch screen such that the location of the pointer on the touch-screen is referred to as a "proximity touch" and an action of brining the pointer into contact with the touch-screen is referred to as a "contact touch" in the following description. Also, a proximity touch point of the pointer on the touch screen means a point of the touch screen to which the pointer corresponds perpendicularly to the touch-screen when the pointer proximity touches the touch screen.

Further, the proximity sensor 141 senses a proximity touch and a proximity touch pattern (for example, proximity touch distance, proximity touch direction, proximity touch speed, proximity touch time, proximity touch position, proximity touch movement state, etc.). Information corresponding to the sensed proximity touch action and proximity touch pattern can be also displayed on the touch screen.

Also, the audio output module 152 can output audio data stored in the memory 160 or received from the wireless communication unit 110 in call signal reception, a phone call mode or a recording mode, a voice recognition mode, and a broadcast reception mode. The audio output module 152 also outputs a audio signals related to functions (for example, a call signal reception sound, a message reception sound, etc.) performed in the mobile terminal 100. The audio output module 152 can include a receiver, a speaker, and a buzzer.

The alarm unit 153 outputs a signal for indicating a generation of an event of the mobile terminal 100. Examples of events generated in the mobile terminal 100 include receiving a call signal, receiving a message, inputting a key signal, inputting a touch, etc. The alarm unit 153 can output signals in forms different from a video signal and an audio signal, for example, a signal for indicating a generation of an event through vibration. The video signal or audio signal can be also output through the display unit 151 or the voice output module 152.

The haptic module 154 generates various haptic effects that the user can feel. A representing example the haptic effects is vibration. The intensity and pattern generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin surface, an effect of stimulus according to a jet force or sucking force of air through a sucking hole or a jet hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can transmit haptic effects through a direct contact but also allow the user to feel haptic effects through kinesthetic sense of fingers or arms. The mobile terminal 100 can also include at least two or more haptic modules 154 according to the construction type of the mobile terminal 100.

In addition, the memory 160 stores a program for the operation of the control unit 180, and temporarily store inputted/outputted data (for example, a phonebook, a message, still images, moving images, etc.). The memory 160 can also store data about vibrations and sounds in various patterns, which are output when a touch is applied to the touch-screen. The memory 160 can include at least one of a flash memory type, a hard disk type, a multimedia card micro type, a card type memory (for example, SD or XD memory, etc.), a random access memory (RAM), a static RAM (SRAM), a read-only memory (ROM), an electrically erasable programmable ROM (EEPROM), a programmable ROM (PROM) magnetic memory, a magnetic memory, a magnetic disk, and an optical disk. The mobile terminal 100 can also operate in relation to a web storage performing the storage function of the memory 160 on the Internet.

Further, the interface unit 170 serves as a path to all external devices connected to the mobile terminal 100. The interface unit 170 receives data or power from external devices, or transmits data and power to the internal components of the mobile terminal 100, or transmits data to external devices. The interface 170 can also include a wired/wireless headset port, an external recharger port, a wired/wireless data port, a memory card port, a port for connecting a device with a user identification module, an audio I/O (Input/Output) port, a video I/O (Input/Output) port, an earphone port, etc., for example.

In addition, an identity module is a chip that stores information for authenticating the authority to use the mobile terminal 100, and can include a user identify module (UIM), a subscriber identify module (SIM) and a universal subscriber identify module (USIM). A device (referred to as an identity device hereinafter) including the identity module can be manufactured in the form of a smart card. Accordingly, the identity device can be connected to the terminal 100 through a port.

Also, interface unit 170 can serve as a path through which power from an external cradle is provided to the mobile terminal 100 when the mobile terminal 100 is connected to the external cradle or a path through which various command signals input by a user through the cradle to the mobile terminal 100. The various command signals or power input from the cradle can be used as a signal for confirming whether the mobile terminal 100 has been correctly set in the cradle.

The controller 180 controls the overall operation of the mobile terminal 100. For example, the controller 180 performs control and processing for voice communication, data communication, and video telephony. In FIG. 8, the controller 180 includes a multimedia module 181 for playing multimedia. The multimedia module 181 can be included in the controller 180, or separated from the controller 180. Further, controller 180 can perform a pattern recognition process capable of recognizing a handwriting input or a picture drawing input applied to the touch screen as characters and images. In addition, the power supply unit 190 receives an external power and an internal power provides power required for the operation of the components of the mobile terminal 100 under the control of the controller 180.

Further, various embodiments of the present invention can be implemented in a computer or a similar device of readable recording medium using software, hardware, or a combination thereof, for example. According to a hardware implementation, the embodiments can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for executing functions. The embodiments can also be implemented by the controller 180.

According to a software implementation, embodiments such as procedures and functions described can be implemented with a separate software module executing at least one function or operation. Software codes can be implemented according to a software application written in an appropriate software program language. Furthermore, the software codes can be stored in the memory 160 and executed by the controller 180.

In addition, the illumination unit 80 can include a plurality of the illumination unit 80 being spaced out in an equal distance. The plurality of the illumination unit 80 can be turn on/turn off in various combinations according to a control method to enhance beauty of a display device.

While embodiments according to the present invention have been described hereinabove, it will be understood by a person in the art that these are merely exemplary and a variety of changes and equivalents are made in the embodiment. Thus, the scope of a genuine technical protection sought by the present invention should be defined in the claims.

In addition, the above-described methods can be implemented in a program recorded medium as computer-readable codes. The computer-readable media may include all kinds of recording devices in which data readable by a computer system are stored. For example, the computer-readable media include ROM, RAM, CD-ROM, magnetic tapes, floppy discs, optical data storage devices, and Internet transmission.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A display device, comprising:
  a body;
  a display part disposed inside of the body, and configured to display information;
  a first window disposed on a front surface of the display part and maintaining a distance from the body and the display part;
  a second window provided between the body and the first window, and attached to at least one edge of the first window,
  a touch pad provided between the first window and the display, and configured to receive input;
  a silver pattern formation region disposed at edge regions of the touch pad, and configured to transmit signals generated by the input; and
  a print layer formed on the inner surface of the first window at a location corresponding to a silver pattern formation region, and configured to cover the silver pattern formation region,
  wherein an outer surface of the first window and an outer surface of the second window form at least a part of outer surfaces of the display device.

2. The device of claim 1, wherein a shape of the first window is a plate form, the outer surface of the first window is at least one of a flat surface shape, a convex shape, and a concave shape, and an inner surface of the first window is of a flat form.

3. The device of claim 1, wherein the second window is configured to transmit a light source of the display part to a lateral direction of the body.

4. The device of claim 1, wherein the second window is attached to opposite edges of the longitudinal direction of the first window.

5. The device of claim 1, further comprising:
  a mirror deposition layer formed on at least one of an upper surface and a lower surface of the second window; and
  a first adhesion layer configured to attach the lower surface of the second window and an upper surface of the body.

6. The device of claim 5, further comprising:
  a second adhesion layer configured to attach the upper surface of the second window to at least one edge of a plurality edges of the first window.

7. The device of claim 6, wherein the first and the second adhesion layers have a similar refraction index to the first and the second windows, and are formed of materials with high light transmittance ratio.

8. The device of claim 7, wherein an area of the upper surface of the second window is smaller than an area of the lower surface of the second window, the outer surface of the second window is of an inclination surface, and an inner surface of the second window is of a vertical surface.

9. The device of claim 5, further comprising:
  a third adhesion layer disposed on an upper surface of the touch pad to attach the touch pad and the inner surface of the first window to each other wherein the silver pattern formation region of the touch pad is disposed between the first window and the second window.

10. The device of claim 9, wherein the print layer is formed on the inner surface of the first window and adhered to the third adhesion layer.

11. The device of claim 9, further comprising:
a second adhesion layer configured to attach the lower surface of the touch pad and the upper surface of the second window to each other.

12. The device of claim 5, further comprising:
a black matrix formed at edges of the display part, and attached to the lower surface of the second window.

13. The device of claim 5, further comprising:
an illumination unit configured to emit light outwardly through the second window which is provided at an inner side of the second window.

14. The device of claim 1, wherein a shape of the second window is of a prism shape that refracts a light source of the display part to transmit light in a lateral direction of the body.

15. The device of claim 1, wherein an upper surface of the second window has a wider area, the lower surface of the second window has a smaller area, the outer surface is a vertical surface, and an inner surface is formed of an inclination surface.

16. The device of claim 1, wherein the display device includes a portable display device.

17. The device of claim 1, wherein the display device includes a mobile communication terminal, and the mobile communication terminal includes a communication module for transmitting/receiving information.

* * * * *